Nov. 22, 1960 I. R. BRENHOLDT 2,961,574

IMAGE SIGNAL NOISE SUPPRESSION

Filed July 17, 1956

INVENTOR
IRVING R. BRENHOLDT
BY
Pennie, Edmonds, Morton, Barrows and Taylor
ATTORNEYS United States Patent Office 2,961,574
Patented Nov. 22, 1960

2,961,574

IMAGE SIGNAL NOISE SUPPRESSION

Irving R. Brenholdt, Mount Vernon, N.Y., assignor to Farrand Optical Co., Inc., New York, N.Y., a corporation of New York Filed July 17, 1956, Ser. No. 598,315
6 Claims. (Cl. 315—11)

Figures 1, 2:
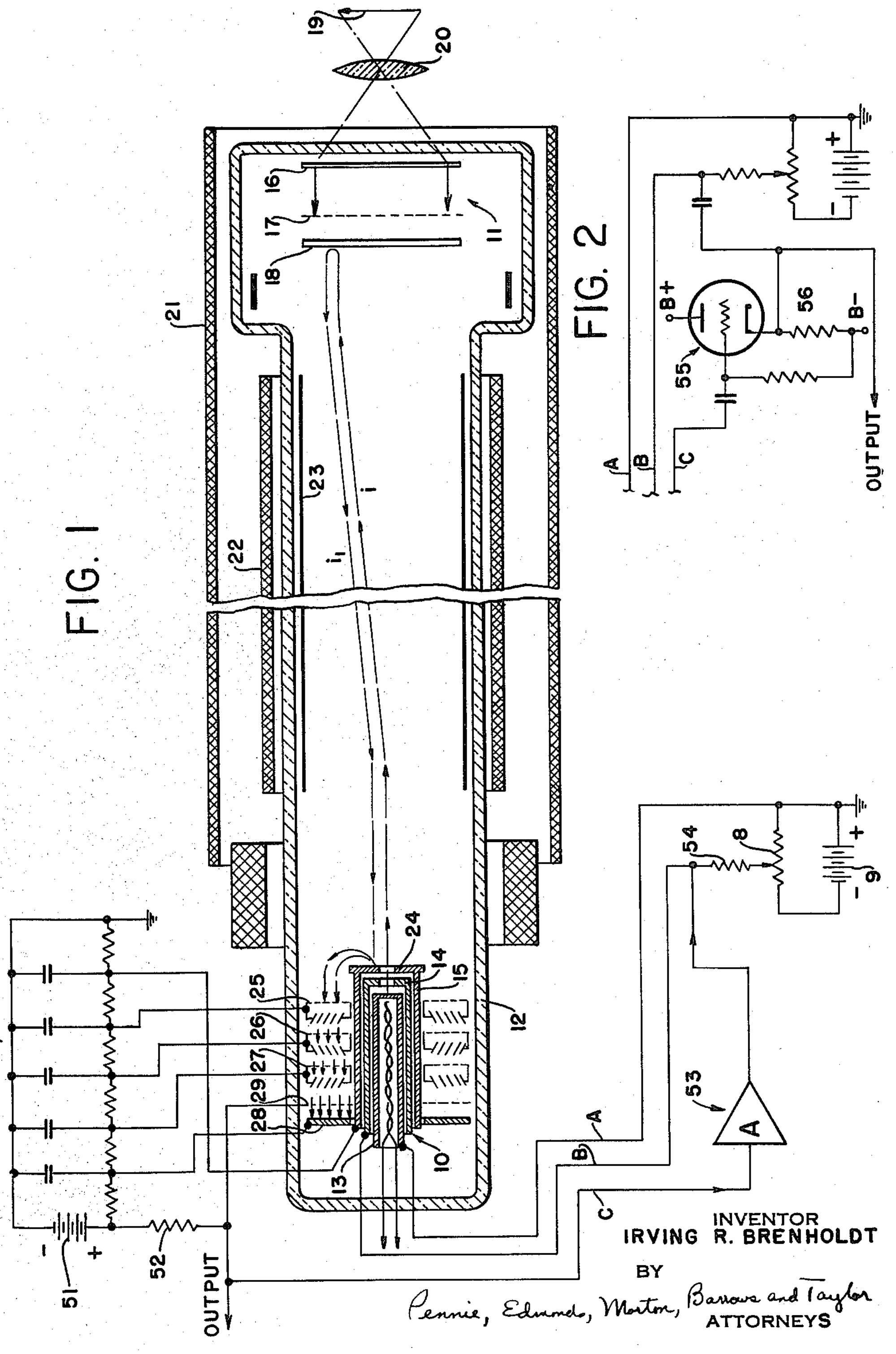

The present invention relates to a method and electrical apparatus for the reduction of noise in image signal transmission systems, particularly in such a system employing a cathode ray image signal generator tube of the "Image Orthicon" type, and operating with a relatively low level of scene illumination.

Generator tubes of the "Image Orthicon" type are provided with a photosensitive image section for converting an optical image into an electrostatic positive charge image upon a target electrode. An electron beam of the tube, the current intensity of which is controllable by means of an apertured control electrode disposed in its path, is utilized to scan the target electrodes. As thus scanned the positive charge on the target electrode removes electrons from the beam in sufficient number to cancel the charge and in this manner the current intensity of the beam is modulated. The modulated beam is then directed to a collector electrode where it is converted into video or image signals for transmission to a receiving unit.

Ideally the sensitivity of a tube of the "Image Orthicon" type to optical images of a weakly illuminated object field is limited only by the photosensitivity of its image section. Actually, however, the sensitivity of the tube is further limited by random noise fluctuations inherently present in its scanning beam. Such noise fluctuations add undesirable current modulation to the electron beam which must be exceeded by the current modulation produced by the optical image in order that an intelligible image signal may be produced. The magnitude of the noise fluctuations therefore requires a certain minimum or threshold illumination level below which the tube cannot effectively operate.

It is the object of the present invention to increase the sensitivity of a generator tube of the "Image Orthicon" type. To this end the invention provides a method and circuit arrangements for suppressing image signal noise modulation caused by the scanning electron beam. In accordance with the method the circuit arrangements are adapted to enable the current intensity of the scanning beam to be varied in inverse proportion to the current intensity of the modulated beam.

In a circuit arrangement particularly contemplated by the present invention image signals derived from the generator tube are developed across a load impedance connected in series with the collector electrode. A voltage amplifier circuit is provided, which circuit is adapted to produce a voltage output having the same polarity as that of the voltage applied to its input. The image signals developed across the load impedance are coupled into the voltage amplifier circuit by means of an input circuit including an electrical connection from the collector electrode end of the load impedance to the amplifier input. In this manner voltages which vary in direct proportion to the image signals are produced at the output of the voltage amplifier circuit. Finally an electrical connection from the output of the amplifier circuit to the control electrode of the generator tube is provided for applying the voltages produced at the amplifier output to the control electrode.

The invention will now be described in detail in connection with the accompanying drawing in which:

Fig. 1 schematically illustrates a generator tube of the "Image Orthicon" type, and an associated voltage amplifier circuit for suppressing scanning beam noise modulation; and Fig. 2 is a circuit diagram of a cathode follower circuit which may be employed in place of the voltage amplifier circuit of Fig. 1.

Referring to Fig. 1, the "Image Orthicon" tube includes an electron gun 10 and an image section 11 positioned at either end of an evacuated glass envelope 12. The electron gun includes a cathode or electron emitter 13, a control electrode or grid 14, and an accelerator or beam-forming electrode 15. The relative potentials of the cathode and control electrode are established by potentiometer 8 and battery 9. These potentials determine the current intensity of the electron beam which is accelerated through the tube by electrode 15.

Image section 11 includes a photo-cathode 16, a conductive screen 17 and a target electrode 18. When a light image of an object 19 is projected upon photo-cathode 16 by a lens system 20, photo-electrons are released in direct proportion to the brightness of the image. A uniform electric field between photo-cathode 16 and target electrode 18 accelerates the released photo-electrons toward the target, while a uniform axial magnetic field produced by coil 21 focuses them upon the target. The intensity of the electric field has a value such that the photo-electrons reach target 18 with sufficient velocity to cause secondary emission greater than unity thereby producing a positive electrostatic charge reproduction of the optical image upon the target. The secondary electrons released by the target electrode are collected by conductive screen 17.

At the same time the electrostatic charge image is being produced upon the target electrode the electron beam formed by electron gun 10 is caused to scan the target electrode by beam deflection means including deflection coil 22 and focusing coil 21. As the scanning beam electrons approach the tarket electrode they are decelerated to substantially zero velocity. A positive potential sufficient to start the beam electrons on a return path is applied to conducting cylinder 23. In the scanning process, when the beam reaches a portion of the target electrode having no positive charge (the corresponding portion of the optical image being black), all the electrons in the beam are started on a return path by cylinder 23. When the beam reaches a portion of the target having a positive charge such number of electrons as are required to cancel the positive charge are removed from the electron beam before it is started on its return path by cylinder 23. In this way the current intensity of the beam is modulated in accordance with the electrostatic charge image on the target electrode.

Deflection coil 22 and focusing coil 21 cause the modulated electron beam to follow a return path parallel to its forward path and onto the end surface 24 of accelerator electrode 15. End surface 24 is made highly electron emissive so that the impacting electrons of the modulated beam produce secondary electrons. The secondary electrons are directed upon the successive electron emissive stages 25, 26, 27 and 28 of an electron or dynode multiplier arrangement, each stage of the election multiplier being adapted to increase the current intensity of the modulated beam. The secondary electrons emitted by the final stage 28 are caused to impinge upon an output collector electrode 29 where they are converted in image signals.

The stages of the electron multiplier including collector electrode 29 are maintained at proper relative potentials by means of a voltage divider represented generally at 50 and a battery 51. The collector electrode 29 is maintained at the most positive potential while the accelerator electrode is maintained at the most negative potential. A load impedance, resistor 52, is connected between collector electrode 29 and the positive end of the voltage divider. Electrons impinging upon the surface of collector electrode 29 produce a current in resistor 52 which varies in proportion to the current modulation in the electron beam. As a result a video or image signal representative of object 19 is developed across resistor 52.

Any current modulation of the electron beam which is not introduced by the positive electrostatic charge on the target electrode will produce undesired signal fluctuations across resistor 52 and consequently imperfections in the picture produced at a receiving unit. Such current modulation is particularly undesirable when the generator tube is operating with a relatively low level of scene illumination.

Accordingly, one of the factors limiting the sensitivity of the tube to optical images of a weakly illuminated object field is the noise or random current fluctuations inherently present in the scanning beam. This noise is due primarily to the random manner in which electrons are emitted by the thermionic cathode and is proportional to the square root of the current intensity of the beam. In accordance with the present invention the effect of the current modulation introduced by such noise fluctuations is substantially reduced by varying the current intensity of the scanning electron beam in inverse proportion to the current intensity of the modulated electron beam.

A consideration of the operation of the generator tube will explain why such dynamic current intensity adjustment of the scanning beam is thus effective. As has been described positive charges are formed upon the target electrode of the tube, the concentration of which charges varies directly with the illumination level of the image portion represented thereby. In conventional operation the average current intensity of the scanning beam is fixed at a value large enough to discharge the greatest concentrations of positive charge which may represent only a small fraction of the total area being viewed. With this arrangement the current intensity of the beam reflected to the collector electrode by the dark areas of the image (little or no positive charge on the target electrode) is fixed by the larger current requirements of the highlights of the image. This in itself is undesirable because of the direct relationship between noise and beam current intensity. The situation is further compounded, however, by the fact that the dark areas of the image contain little or no signal information so that the smaller signals are accompanied to the collector electrode by the greatest amount of noise.

Accordingly, the dynamic current intensity adjustment of the present invention increases the sensitivity of the generator tube to optical images of a weakly illuminated object field by varying the current intensity of the scanning beam in accordance with the current required by the target image at any point in the scanning process. The modulation of the beam returned to the collector electrode presents an inverse dynamic indication of the point-to-point current requirements of the target electrode. Thus, variation of the current intensity of the scanning beam in inverse proportion to the current intensity of the modulated beam produces the desired scanning beam current adjustment.

A preferred electrical circuit for effecting such variations of scanning beam current intensity is illustrated in Fig. 1. The circuit performs as a negative feedback loop, which loop utilizes the current intensity $i_1$ of the modulated beam to control the current intensity $i$ of the scanning beam, and the feedback within which loop is proportional to the ratio $i_1/i$.

The feedback loop employs a voltage amplifier circuit 53. The image signals developed across load impedance 52 are coupled into the voltage amplifier circuit by means of an input circuit including an electrical connection from the collector electrode end of load impedance 52 to the amplifier input. The output voltages of the amplifier circuit are developed across a load impedance resistor 54 and are applied to the control electrode 14 of the generator tube by means of an electrical connection from the output end of load impedance 54. The voltage amplifier circuit is adapted to accurately reproduce the image signals applied to its input both in waveform and polarity. This results in the application of voltages to the control electrode 14 which increase negatively in response to increase in the current intensity of the modulated beam. Thus, the feedback loop varies the current intensity of the scanning beam in inverse proportion to the current intensity of the modulated beam.

In practice an amplifier having a voltage gain of 20 and a bandwidth of 20 megacycles has been successfully employed. Theoretically, with the conventional "Image Orthicon" tube, optimum performance should be realized with an amplifier circuit designed to have a bandwidth in the area of 100 megacycles and a voltage gain of approximately 100.

Though voltage amplification improves the performance of the noise suppression system it is not necessary to the operation thereof. Successful noise suppression has been obtained with a unity gain isolation stage employed in place of amplifier 53. Such a stage is illustrated in Fig. 2 in the form of conventional cathode follower circuit the connections of which are lettered to show the points of substitution in Fig. 1.

The cathode follower circuit includes an electron discharge device, triode 55, having a cathode, control grid and anode, and a load impedance, resistor 56, connected to the cathode in series therewith. A source of anode potential (B+ to B−) is connected across triode 55 and load impedance 56. The image signals developed across load impedance 52 are coupled into the cathode follower circuit by means of an input circuit including a capacitive electrical connection C from the collector electrode end of load impedance 52 to the control electrode of the triode. The output voltages of the cathode follower circuit are developed across load impedance 56. Since a cathode follower circuit possesses an accurately linear amplification characteristic, fluctuations in the image signals are accurately reproduced in direct proportion as voltages developed across load impedance 56. These voltages are applied to the control electrode 14 of the generator tube by means of an output circuit including a capacitive electrical connection B from the cathode end of load impedance 56 to control electrode 14.

Heretofore, without the feedback loop, the resistive value of the signal developing load impedance 52 has generally been relatively low, in the order of 22,000 ohms. To further increase the effectiveness of the feedback loop, it is advantageous to substantially increase the resistive value of impedance 52. By way of example, in a particular embodiment of the invention a resistive value of 2.2 megohms is employed. Ordinarily this increase in the value of impedance 52 would cause loss of high frequency response due to the increased effect of shunt capacitance. The feedback loop, however, has the effect of reducing the effective output capacitance of load impedance 52, thereby preventing any such loss.

Because of inherent time delay in the feedback loop, suppression is not effected for noise having a duration less than the transit time required for a signal to pass through the feedback loop. Noise signals having this short a duration, however, are outside the frequency band required for good quality image reproduction at the receiving unit and consequently have little effect.

A preferred embodiment of the invention has been described. Various circuit changes and modifications may be made within the scope of the invention as set forth in the appended claims.

I claim:

1. In combination with a cathode ray image signal generator tube of the "Image Orthicon" type having, a cathode for producing a scanning electron beam, an apertured control electrode interposed in the path of said electron beam for controlling the current intensity thereof, means for modulating the current intensity of the said scanning electron beam in accordance with light variations of an optical image to produce a modulated electron beam, an output collector electrode, and means for directing the said modulated electron beam to said output collector electrode to be converted into image signals thereat, electrical apparatus for suppressing image signal noise modulation caused by the said scanning electron beam comprising, circuit means coupled to the said collector electrode to be responsive to the said image signals, and adapted to produce voltages directly proportional to said image signals, and circuit means connected to be responsive to said voltages, and adapted to apply said voltages to said control electrode, whereby the current intensity of the said scanning electron beam is varied in inverse proportion to the instantaneous current intensity of the said modulated electron beam.

2. In combination with a cathode ray image signal generator tube of the "Image Orthicon" type having, a cathode for producing a scanning electron beam, an apertured control electrode interposed in the path of said scanning electron beam for controlling the current intensity thereof, means for modulating the current intensity of the said scanning electron beam in accordance with light variations of an optical image to produce a modulated electron beam, an output collector electrode, and means for directing the said modulated electron beam to said output collector electrode to be converted into image signals thereat, electrical apparatus for suppressing image signal noise modulation caused by the said scanning electron beam comprising, a circuit including a load impedance connected in series with the said collector electrode for developing across said load impedance image signals derived from said generator tube, a voltage amplifier circuit adapted to produce a voltage output having the same polarity as that of the voltage applied to its input, an input circuit to said amplifier circuit including an electrical connection from the collector electrode end of said load impedance to the input of said amplifier circuit for applying the image signals developed across said load impedance to said amplifier circuit, and an electrical connection from the output of said amplifier circuit to the control electrode of said generator tube for applying voltages produced at the output of said amplifier circuit to said control electrode, whereby the current intensity of the said scanning electron beam is varied in inverse proportion to the instantaneous current intensity of the said modulated electron beam.

3. In combination with a cathode ray image signal generator tube comprising, an electron emitting cathode for developing a scanning electron beam, means for converting an optical image into an electrostatic charge image including a target electrode of the electrostatic charge storage type disposed in the path of said electron beam, an apertured control electrode interposed between said cathode and said target electrode in the path of said electron beam for controlling the current intensity thereof, beam deflection means for scanning said electron beam over the said target electrode, to be modulated in accordance with the electrostatic charge thereon, an electron multiplier arrangement including an output collector electrode, and means for directing the modulated electron beam to the said electron multiplier arrangement, to be converted into image signals at the said collector electrode, electrical apparatus for suppressing image signal noise modulation caused by the said scanning electron beam comprising, a circuit including a load impedance connected in series with said collector electrode for developing across said load impedance image signals derived from the said generator tube, a voltage amplifier circuit adapted to produce a voltage output having the same polarity as that of the voltage applied to its input, an input circuit to said amplifier circuit including an electrical connection from the collector electrode end of said load impedance to the input of said amplifier circuit for applying the image signals developed across said load impedance to said input, and an electrical connection from the output of said amplifier circuit to the control electrode of said generator tube for applying voltages produced at said amplifier output to said control electrode, whereby the current intensity of the said scanning electron beam is varied in inverse proportion to the instantaneous current intensity of the said modulated electron beam.

4. In combination with a cathode ray image signal generator tube of the "Image Orthicon" type having, a cathode for producing a scanning electron beam, an apertured control electrode interposed in the path of said scanning electron beam for controlling the current intensity thereof, means for modulating the current intensity of the said scanning electron beam in accordance with light variations of an optical image to produce a modulated electron beam, an output collector electrode, and means for directing the said modulated electron beam to said output collector electrode to be converted into image signals thereat, electrical apparatus for suppressing image signal noise modulation caused by the said scanning electron beam comprising, a circuit including a first load impedance connected in series with the said collector electrode for developing across said first load impedance image signals derived from said generator tube, a cathode follower circuit including an electron discharge device having a cathode, control grid and anode, and a second load impedance connected to the cathode of said discharge device in series therewith, an input circuit to said cathode follower circuit including an electrical connection from the collector electrode end of said first load impedance to the control grid of said discharge device for applying the image signals developed across said first load impedance to said control grid, and an output circuit from said cathode follower circuit including an electrical connection from the cathode end of said second load impedance to the control electrode of said generator tube for applying voltages developed across said second load impedance to said control electrode, whereby the current intensity of the said scanning electron beam is varied in inverse proportion to the instantaneous current intensity of the said modulated electron beam.

5. In combination with a cathode-ray image signal generator tube of the "Image Orthicon" type having, means for generating a scanning electron beam, and means for modulating the current intensity of the said scanning electron beam in accordance with light variations of an optical image to produce a modulated electron beam, electrical apparatus for suppressing noise modulation caused by the said scanning electron beam comprising, means for producing an electrical signal proportional to the current intensity of said modulated electron beam, and means for utilizing said electrical signal to vary the current intensity of the said scanning electron beam in inverse proportion to the instantaneous current intensity of the said modulated electron beam.

6. In combination with a cathode-ray image signal generator tube of the "Image Orthicon" type having, means for generating a scanning electron beam, means for modulating the current intensity of the said scanning electron beam in accordance with light variations of an optical image to produce a modulated electron beam, and means for producing from said modulated electron beam image signals proportional to the current intensity thereof, electrical apparatus for suppressing image signal noise modulation caused by the said scanning electron beam comprising, means for producing from said image signals voltages proportional thereto, which said voltages are representative of the current intensity of the said modulated electron beam, and means for utilizing said voltages to vary the current intensity of the said scanning electron beam in inverse proportion to the instantaneous current intensity of the said modulated electron beam.

References Cited in the file of this patent

UNITED STATES PATENTS

| | | |
|---|---|---|
| 2,084,700 | Ogloblinksy | June 22, 1937 |
| 2,451,640 | Thalner | Oct. 19, 1948 |
| 2,465,667 | Thalner | Mar. 29, 1949 |